(12) United States Patent  (10) Patent No.: US 7,953,117 B2
Oksman  (45) Date of Patent: May 31, 2011

(54) HOME NETWORKING SYSTEM (75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 247 days.

(21) Appl. No.: 12/058,315

(22) Filed: Mar. 28, 2008

(65) Prior Publication Data

US 2008/0253388 A1   Oct. 16, 2008

Related U.S. Application Data (60) Provisional application No. 60/922,753, filed on Apr. 10, 2007.

(51) Int. Cl.
*H04H 20/28* (2008.01)
(52) U.S. Cl. ........................................................ 370/487
(58) Field of Classification Search .................. 370/420, 370/254, 389, 487, 463, 331, 338, 436
See application file for complete search history.

(56) References Cited

U.S. PATENT DOCUMENTS

| 2005/0083856 A1* | 4/2005 | Morelli et al. | 370/254 |
| 2006/0218594 A1* | 9/2006 | Wu et al. | 725/74 |
| 2007/0036171 A1* | 2/2007 | Magin | 370/463 |

OTHER PUBLICATIONS

Article by Walter Y. Chen, Reprinted from the Internet at: http://www.phptr.com/articles/article.asp?p=169518&seqNum=1, 30 pgs.

* cited by examiner

*Primary Examiner* — Man Phan
*Assistant Examiner* — Nourali Mansoury
(74) *Attorney, Agent, or Firm* — Eschweiler & Associates, LLC (57) ABSTRACT One embodiment relates to a network. The network includes a first splitter having an input port and N output ports. A first network node is associated with a first of the N output ports. A second network node is associated with a second of the N output ports and is adapted to receive signals communicated from the first network node through the first splitter. Other apparatuses and methods are also set forth.

7 Claims, 8 Drawing Sheets

HOME NETWORKING SYSTEM

RELATED APPLICATIONS

This application claims priority to U.S. Provisional Application Ser. No. 60/922,753 filed Apr. 10, 2007, entitled "HOME NETWORKING SYSTEM."

FIELD OF INVENTION

The present invention relates to networked communication systems.

BACKGROUND

Figure 1:
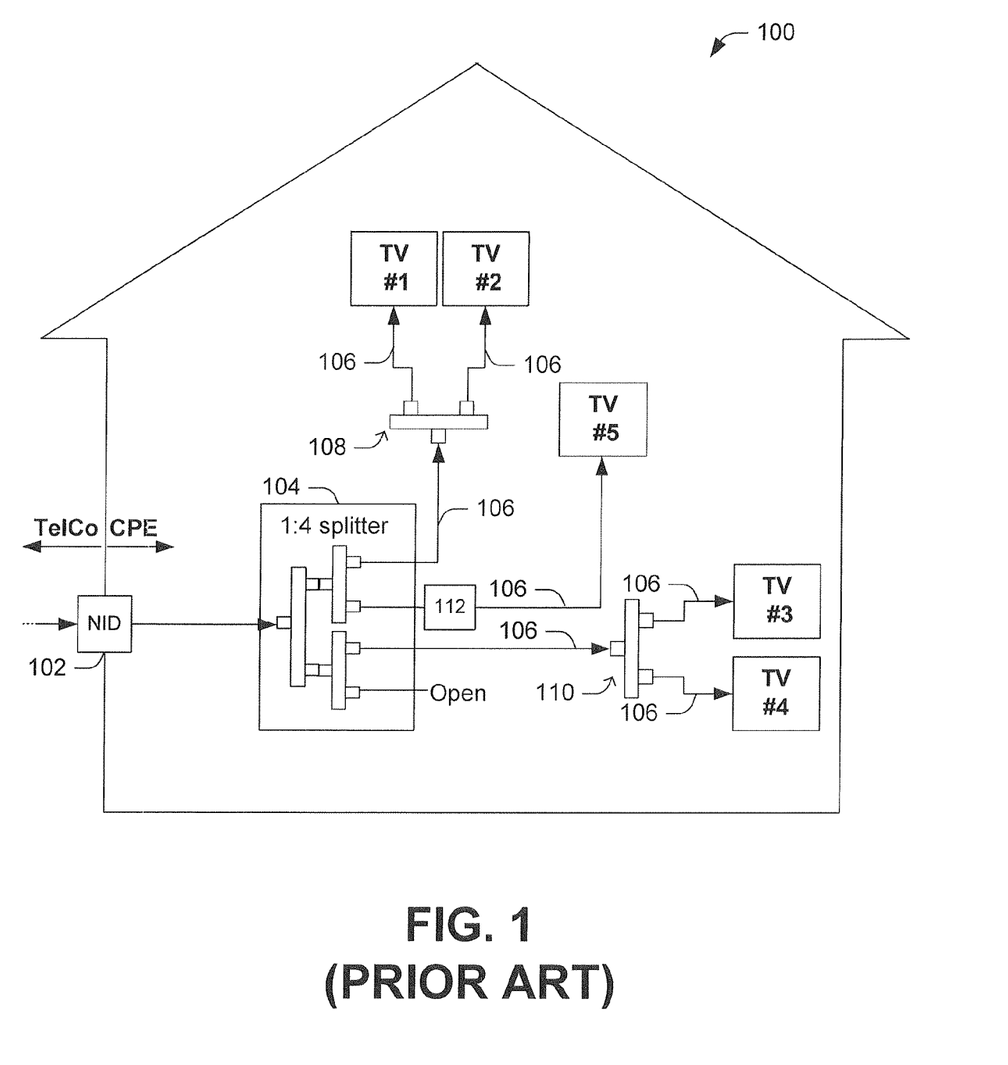
FIG. 1 depicts a cable TV network at a customer's premises where signals are transmitted uni-directionally from the services provider to a user's TVs.

A typical home cable TV topology 100 is presented in FIG. 1. In this topology 100, a Network Interface Device (NID) 102 demarcates a line between telecommunication company equipment ("Tel Co.") and customer's equipment at the customer's premises ("CPE"), such as a home or business. The telecommunications company provides a wide-band cable TV signal to the CPE through the NID 102. In the illustrated example, the cable TV signal is distributed through a 1:4 splitter 104, over existing home wiring 106 (such as coaxial cable, a pair of twisted copper wires, power wiring, etc), though 1:2 splitters 108, 110, and out to TVs in different areas of the CPE. For remote areas with relatively long branches (e.g., TV #5), an amplifier 112 may be used to boost the signal.

Typically, cable TV signals are transmitted in a frequency band between 50 MHz and 850 MHz. Because home wiring 106 can support other frequency bands in addition to this cable TV frequency band, network engineers are developing home networks that use existing home wiring for communication between network nodes other than televisions. For example, these network nodes could include computers, digital video recorders (DVRs), digital TVs, VoIP phones, security systems, and the like; all of which could communicate over frequency bands that are non-overlapping with the cable TV frequency band (e.g., above or below the cable TV frequency band).

Unfortunately, the splitters used in existing home wiring configurations were intended for unidirectional transmission (i.e., from cable telecommunications provider to TV) and not for transmission between network nodes within a home network. Therefore, these splitters have made data transfer between network nodes within home networks extremely difficult until now.

SUMMARY

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment relates to a network. The network includes a first splitter having an input port and N output ports. A first network node is associated with a first of the N output ports. A second network node is associated with a second of the N output ports and is adapted to receive signals communicated from the first network node through the first splitter. Other apparatuses and methods are also set forth.

The following description and annexed drawings set forth in detail certain illustrative aspects and implementations of the invention. These are indicative of but a few of the various ways in which the principles of the invention may be employed.

DETAILED DESCRIPTION

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Figure 2:
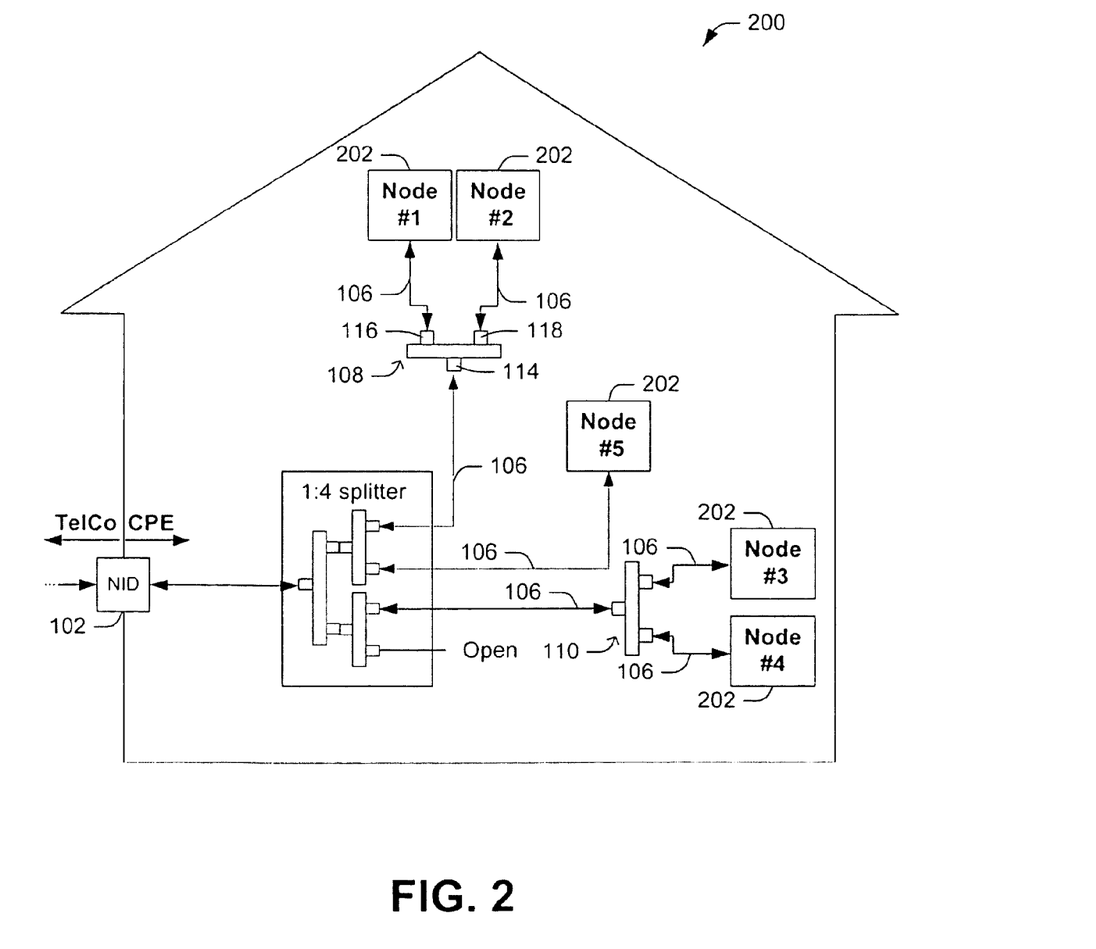
FIG. 2 depicts a home network where signals are bi-directionally communicated between network nodes.

Referring now to FIG. 2, one can see an example of a home network 200 that includes several network nodes 202 accessible via cable jacks. These network nodes 202 transmit and receive data to and from one another over the existing home wiring 106. As now discussed in the context of FIG. 2, the inventors have appreciated several shortcomings arising from splitters in the home network 200, and have devised solutions to remedy these shortcomings.

To understand how splitters make communication difficult between network nodes 202, reference is now made to Table 1, which shows power gain values for transmission between the output ports 116, 118 of a 1:2 splitter 108. As can be seen, when a load Z1 at the input port 114 is matched to a load Z3 at an output port 116, a theoretically infinite loss occurs between the output ports 116, 118.

TABLE 1

Output Port 2 to Output port 3 Power Gain Values.

| Z3 | Z1 | R | Power Gain |
|----|----|----|------------|
| 75 | 75 | 150 | 0 ($-\infty$ dB) |
| 75 | $\infty$ | 150 | ⅓ (−4.77 dB) |
| 75 | 0 | 150 | ⅓ (−4.77 dB) |

TABLE 1-continued

Output Port 2 to Output port 3 Power Gain Values.

| Z3 | Z1 | R | Power Gain |
|----|----|----|------------|
| 75 | 75 | 132.16 | 0.001 (−30 dB) |
| 75 | ∞ | 132.16 | 0.362 (−4.41 dB) |
| 75 | 0 | 132.16 | 0.306 (−5.15 dB) |

In other words, if Network Node 1 transmitted a signal to Network Node 2 over 1:2 splitter 108, the signal would be significantly attenuated if it followed a path directly from output port 116 to output port 118 (assuming matched impedances at the input and output ports). This would significantly reduce the bit rates achievable between these network nodes, absent countermeasures.

In appreciating this deficiency in home networks, the inventors have also appreciated that a relatively small propagation loss occurs when a signal is transmitted from a splitter's output port to its input port (e.g., from output port 116 to input port 114, or from output port 118 to input port 114). As can be seen in Table 2 below, for the 1:2 splitter 108 previously considered, a relatively small attenuation of about 3 dB occurs when the load Z1 at the input port 114 is matched to a matched load Z3 at the output port 116.

TABLE 2

Output Port 2 to Input Port 1 Power Gain Values.

| Z1 | Z3 | R | Power Gain |
|----|----|----|------------|
| 75 | 75 | 150 | ½ (−3.02 dB) |
| 75 | ∞ | 150 | ½ (−3.02 dB) |
| 75 | 0 | 150 | ½ (−3.02 dB) |
| 75 | 75 | 132.16 | 0.501 (−3.01 dB) |
| 75 | ∞ | 132.16 | 0.532 (−2.74 dB) |
| 75 | 0 | 132.16 | 0.468 (−3.29 dB) |

In view of these considerations, the inventors have fashioned several advantageous home network configurations that facilitate efficient communication between network nodes within a home network that includes splitters.

Figure 3:
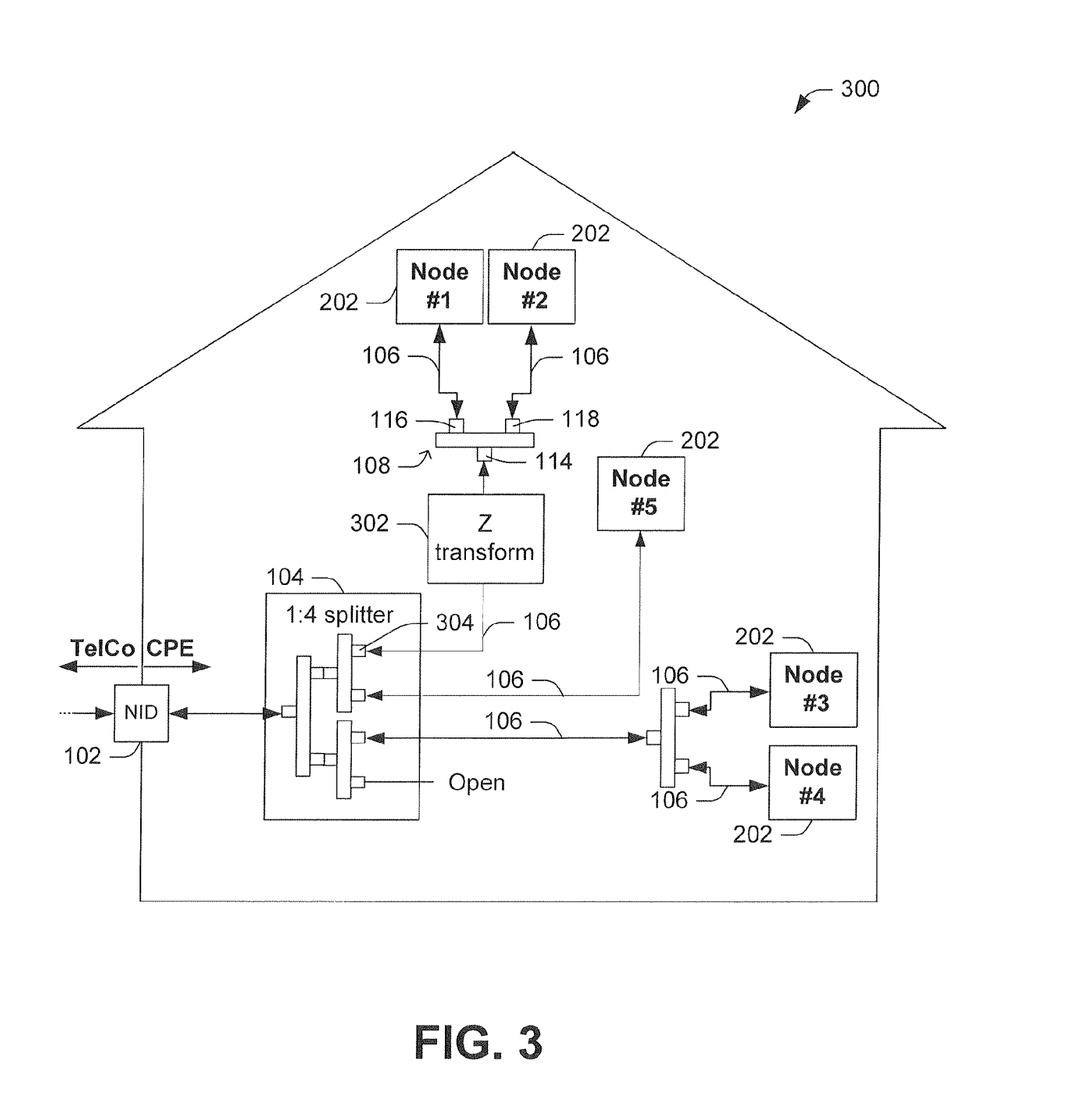
FIG. 3 depicts an embodiment of a home network including an impedance transformer.

Referring now to FIG. 3, one can see an embodiment in accordance with the invention where an impedance transformer 302 is strategically inserted into the home network. On the one hand, the impedance of the impedance transformer 302 is chosen so it provides a matched impedance between output port 304 of the 1:4 splitter 104 and input port 114 of the 1:2 splitter n108. The impedance of the impedance transformer 302 is also chosen so the impedance seen at the input port 114 of the 1:2 splitter 108 differs from the impedance seen at an output port of the 1:2 splitter 108 (e.g., output port 116). As shown in Table 1 above, this configuration reduces isolation between output ports 116, 118 of the splitter 108 so that signals can be transmitted between Network Node #1 and Network Node #2 with lower attenuation. In this manner, one or more impedance transformers 302 could be strategically associated with standard splitters to allow for efficient communication between network nodes 202. However, to make use of the impedance transformer 302, the user may need to identify which splitter is causing a problem between network nodes. Because splitters are often hidden inside of walls or in places unknown to the user, a strategically placed impedance transformer may be difficult to implement as a practical matter. Nonetheless, it may still be useful in some contexts.

Figure 4:
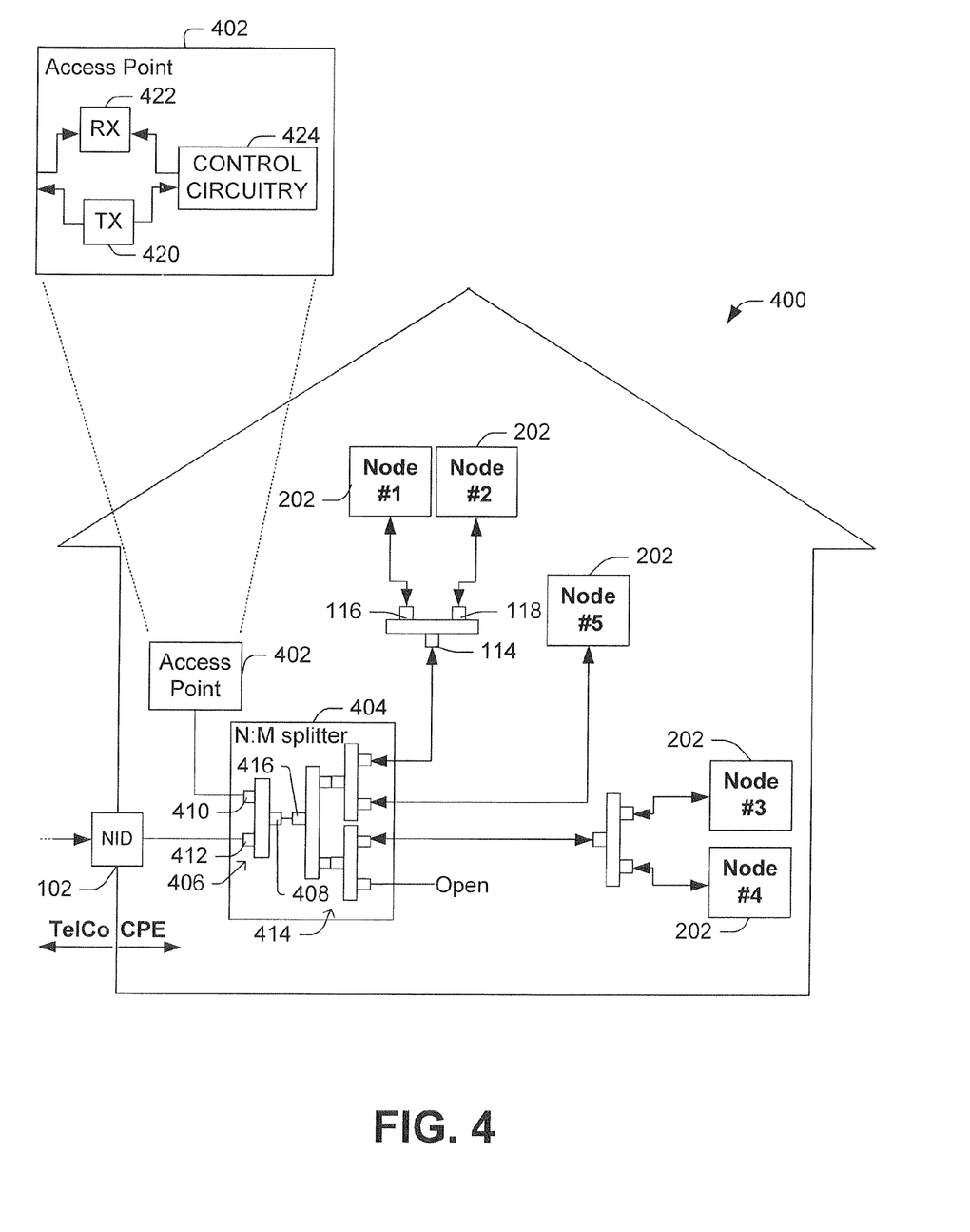
FIG. 4 depicts an embodiment of a home network including an access point.

Referring now to FIG. 4, one can see an embodiment of a home network 400 that includes an access point 402 that can be installed at an easily accessible location, such as at the NID 102 or between the NID 102 and a first N:M splitter 404. In this home network architecture, the network nodes 202 first transmit data to the access point 402, where the payload data is ultimately intended for another network node (addressee node). Due to the tree-like topology of the home network 400, for each splitter this data passes from an output port through an input port, thereby avoiding passing from one output port to another output port of the same splitter (e.g., output port 116 through input port 114 from Network Node 1). After the access point 402 receives the data, the access point 402 may amplify the received data and then re-communicates the data back through the home network to the addressee node. In this re-communication phase, for each splitter the data passes from an input port through an output port (e.g., from input port 114 to output port 118 to network node 2), again avoiding passing directly between output ports of the same splitter. In this manner, even though the data passes over the network multiple times, the data is communicated over the network with relatively low attenuation, thereby effectively increasing network throughput.

To facilitate this functionality, the home network includes an N:M splitter 404, where N and M are both integers greater than or equal to two. For example, in the illustrated embodiment N is 2 and M is 4. The N:M splitter 404 includes a first splitter 406 having an input port 408 and N output ports 410, 412. The N:M splitter 404 also includes a second splitter 414 having an input port 416 and M output ports, where the input port 408 of the first splitter is tied to the input port 416 of the second splitter. Although the second splitter 414 is shown as including three 2:1 splitters, it could also include other combinations of splitters, as could the first splitter. In this way, the N:M splitter 404 provides low attenuation for signals going to and from the access point 402 to the network nodes 202 in the home network. The N:M splitter 404 may also block Cable-TV signals from entering the access point 402, and may block access point signals from entering the Telecommunication Company equipment behind the NID 102. Although this is one example of a streamlined implementation, more sophisticated implementations can provide a loss of less than 3 dB in the N:M splitter 404.

As shown, the access point 402 may include a transmitter 420, a receiver 422, and control circuitry 424 to facilitate the desired functionality as set forth herein. The receiver 422 will receive signals transmitted by the network nodes over the N:M splitter. The control circuitry 424 will analyze the received signals to determine which, if not all, of the received signals are to be re-communicated to the network nodes. Lastly, the transmitter 420 will re-communicate the signals to the addressee node. The re-communication may include amplification of the signal.

Figure 5:
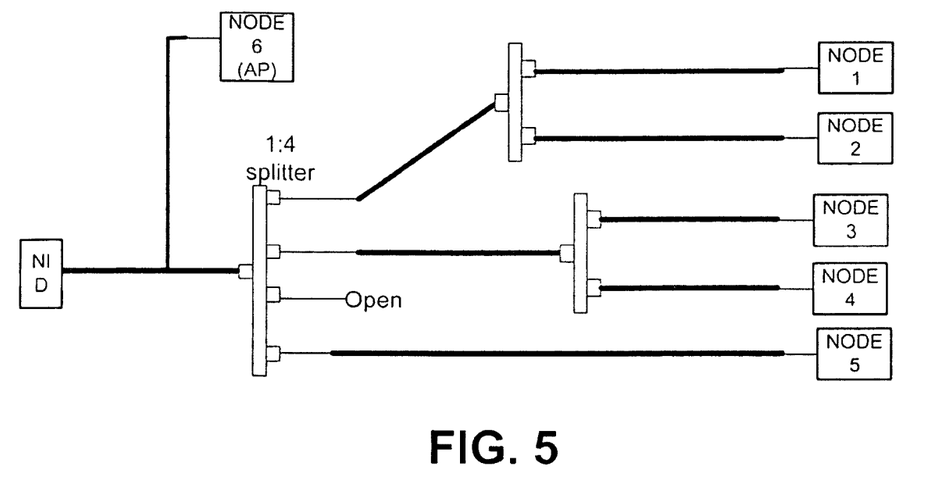
FIGS. 5-6 show other embodiments of home networks including an access point.
Figure 6:
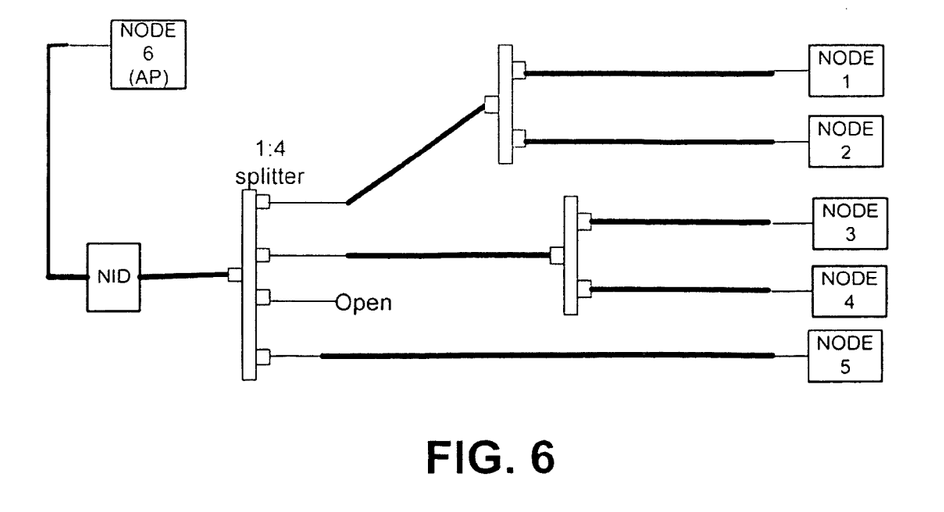

FIGS. 5-6 show other network arrangements that include an access point. As these figures illustrate, the access point need not be coupled to an N-to-M splitter in some embodiments. For example, in FIG. 5, the access point is coupled directly to the wire or cable at the input of the 4:1 splitter. In FIG. 6 the access point is coupled behind the NID. As will be appreciated from these figures, the access point is connected to the home network prior to the first splitter in the house over which two nodes communicate.

Because the network nodes 202 share the same communication medium, which can only support up to some maximum total bandwidth, the total amount of information that can be transmitted per unit time over the network 400 is limited. Therefore, to ensure the network nodes 202 have sufficient bandwidth for their respective applications (e.g., IPTV, streaming video, etc.), communication among the network nodes is often structured to avoidance signal interference between the network nodes 202.

To structure communication to avoid collisions, one of the network nodes 202 or the access point 402 is selected to act as a master node that manages communications within the network 400. This master node keeps track of the nodes 202 associated with the network 400 and the respective quality of service (QoS) requirements for the applications associated with those nodes. Based on this data, the master node assigns the network nodes to transmit during specified time periods or in specified frequency bands.

In one embodiment, the access point 402 acts as the master node. This allows for efficient communication. In other embodiments where another network node acts as the master node, the network will experience decreased data throughput because communication from the Master to any network node will take two transmission cycles (e.g., first from the master to the access point, and then from access point to the addressee node).

In one embodiment, the access point 402 could be a repeater that receives all frames sent by other network nodes and retransmits them (with optional amplification) back into the home network. In one embodiment a repeater could be a linear amplifier, which input and output are connected through a hybrid, which isolates between them. However, a repeater may cause some nodes to receive the same frame multiple times (i.e., the originally transmitted frame (weaker signal) and the retransmitted frame (stronger signal, but shifted in time)). This may cause the home network to multiplication the number of frames, possibly overloading the network.

Figure 7:
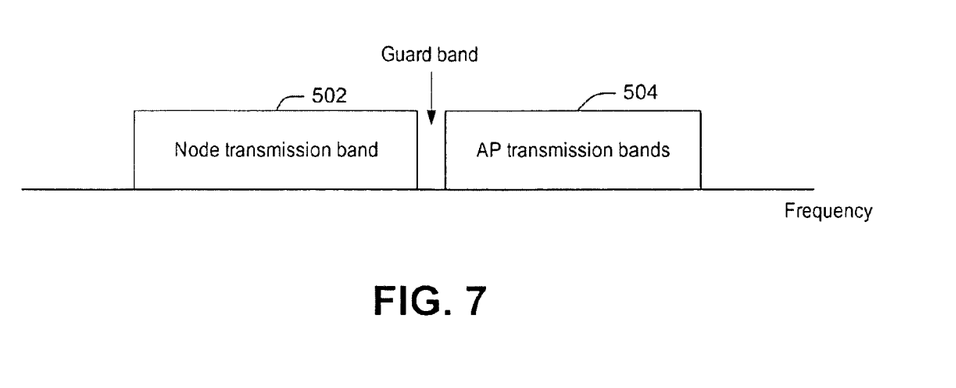
FIG. 7 is a chart showing one embodiment for structuring communication on a home network including an access point by using frequency division.

This retransmission problem may be solved if the access point 402 transmits and receives in different frequency bands. Thus, FIG. 7 shows and embodiment where the access point 402 receives signals from the network nodes in one frequency band 502, and transmits signals to the network nodes in another frequency band 504. This solution uses double bandwidth which may be inefficient in some contexts.

Figure 8:
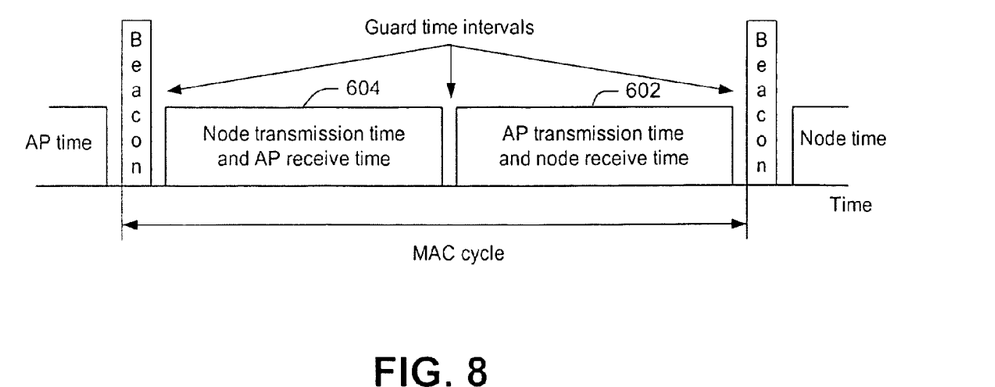
FIG. 8 is a chart showing one embodiment for structuring communication on a home network including an access point by using time division.

In another embodiment, the access point 402 could be a relay node through which all network nodes communicate with one another. In this mode, the network nodes 202 transmit frames that are addressed to the access point 402, but which specify an addressee node for which the payload data in the frame is ultimately intended. The access point 402 receives these frames and forwards them to the addressee nodes. To avoid interference between transmitting nodes, the master node (e.g., access point) can assign all network nodes including the access point to individual transmit and receive times. FIG. 8 shows an example of time division where the access point 402 is assigned to a first transmission time 602 and the network nodes 202 are assigned to other transmission times 604. Another way for this embodiment to avoid interference is by using frequency separation (see FIG. 7), or combinations of frequency division and time division.

Now that several examples of several systems have been discussed, a method in accordance with aspects of the invention are now described with reference to FIG. 9. The network nodes include suitable circuitry, state machines, firmware, software, logic, etc. to perform the various methods and functions illustrated and described herein, including but not limited to the methods described below. While the methods illustrated below are illustrated and described as a series of signal patterns, acts, or events, it will be appreciated that the present invention is not limited by the illustrated ordering of such signal patterns, acts, or events. For example, some acts may occur in different orders and/or concurrently with other acts or events apart from those illustrated and/or described herein, in accordance with the invention. In addition, not all illustrated steps may be required to implement a methodology in accordance with the present invention.

Figure 9:
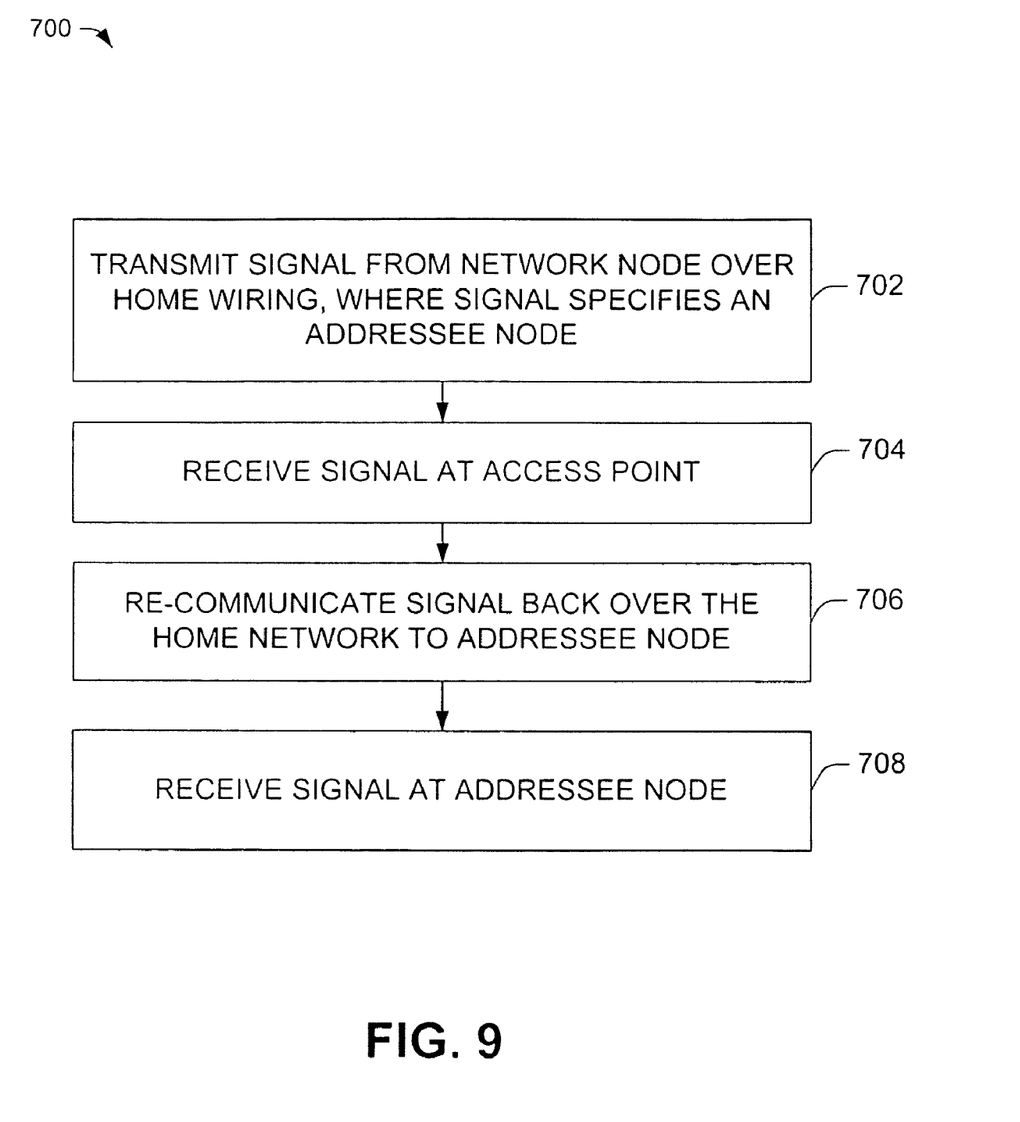
FIG. 9 is a flowchart showing one embodiment of a method in accordance with an aspect of the invention.

Referring now to FIG. 9, one can see that method 700 starts at 702, where a network node transmits a signal over home wiring. In this embodiment, the signal specifies an addressee node.

At 704, the access point receives the signal. The access point may analyze the signal to determine the addressee node.

At 706, the access point re-communicates the signal back over the home network to the addressee node. In some embodiments, the access point will amplify the signal when it is re-communicated.

At 708, the signal is received at the addressee node. Although this flowchart shows a streamlined methodology, other variations are also possible.

Example

Figure 10:
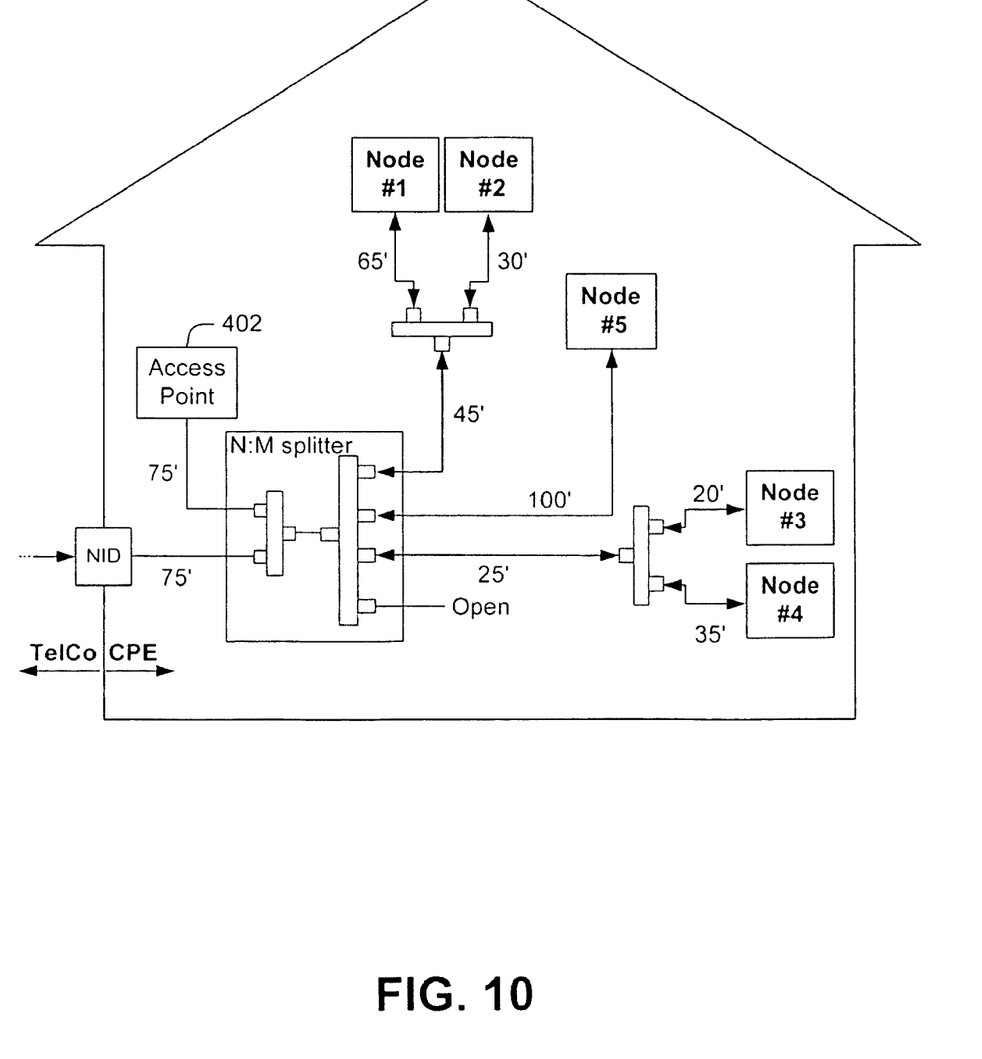
FIG. 10 shows a specific implementation consistent with one embodiment of the present invention.

The following example shows how one embodiment of an access point works in the case of home network topology presented in FIG. 10. In this example, signal attenuation is analyzed for two cases where a signal is transmitted from Network Node 1 to Network Node 5. In the first case, the signal is transmitted from node 1 to node 5 via the access point 402. In the second case, the signal is transmitted from Network Node 1 to Network Node 5 without the access point. For both cases, the lengths are shown in FIG. 10, and it is assumed that RG-59 cable is used for all connections, where the RG-59 cable has an attenuation of approximately 8.3 dB/100 ft at 850 MHz.

In the first case, the signal transmitted from Network Node 1 to the access point 402 will experience an attenuation of 26.4 dB over this transmission path. More specifically, this transmission path includes 185 ft of cable (14.6 dB of attenuation (i.e., 185 ft*8.3 dB/100 ft=14.6 dB)), a 2:1 splitter (about 3 dB of attenuation), a 4:1 splitter (about 6 dB of attenuation), and a 1:2 splitter (about 3 dB of attenuation). The access point will then amplify the received signal and re-transmit it back to Network Node 5, thereby incurring a total attenuation of 23.525 dB over this re-transmission path. This re-transmission path includes 175 ft of cable (14.525 dB of attenuation (i.e., 175 ft*8.3 dB/100 ft=14.525 dB)), a 2:1 splitter (about 3 dB of attenuation), a 1:4 splitter (about 6 dB of attenuation), and a 1:2 splitter (about 3 dB of attenuation). Thus, in the first case, the maximum attenuation encountered on either transmission paths is 26.4 dB.

If the access point 402 is connected directly to the input of the 4:1 splitter or to NID, as shown in FIG. 5 and FIG. 6, respectively, the 3 dB attenuation of 2:1 splitter will be reduced and thus total signal attenuation will drop to 23.4 dB.

In the second case, the signal transmitted from network node 1 to network node 5 experiences an attenuation of almost 60 dB. More specifically, this transmission path includes 210 ft of cable (17.43 dB of attenuation), a 2:1 splitter (about 3 dB), a 1:4 splitter (36 dB—3 dB over a first splitter, where 30 dB is because output to output path in the splitter, and 3 dB over second splitter).

Therefore, one can see that the access point reduces attenuation and therefore provides higher bit-rates than previously achievable.

While examples of the invention have been illustrated and described with respect to one or more implementations, alterations and/or modifications may be made to the these examples without departing from the spirit and scope of the appended claims. In regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A network, comprising:
   a first splitter having an input port and N output ports;
   a second splitter having an input port and M output ports, where the input port of the first splitter is tied to the input port of the second splitter;
   a first network node associated with a first of the N output ports; and
   a second network node associated with a second of the N output ports, wherein the second network node receives signals transmitted from the first network node through the first splitter; and
   an access point operably coupled to a first of the M output ports, wherein the access point receives signals transmitted through the first splitter from the first network node, and retransmits the received signals into the first of the M output ports through the first and second splitters to the second network node.

2. The network of claim 1, where the access point is configured to transmit and receive the signals through a network interface device to communicate with the first and second network nodes.

3. The network of claim 1, where the access point is configured to receive the signals from the first network node over a first frequency band and re-transmit the signals to the second network node over a second frequency band.

4. The network of claim 1, where the access point is configured to receive the signals from the first network node during a first time period and re-communicate the signals to the second network node during a second time period that is non-overlapping with the first time period.

5. The network of claim 1, further comprising:
   a network interface device associated with a second of the M output ports and configured to provide a telecommunications signal to the network.

6. The network of claim 1, wherein the access point retransmits substantially all signals that the access point receives with a higher power than that of the received signals.

7. A method of communication between nodes of a network, where the network includes a first splitter having an input coupled to an input of a second splitter, comprising:
   transmitting a first input signal from a first network node into a first output port of the first splitter;
   providing a first output signal, which corresponds to the first input signal, from an input port of the first splitter;
   transmitting a second input signal, which corresponds to the first output signal, into an input port of the second splitter;
   receiving a second output signal, which corresponds to the second input signal, at an access point; and
   re-transmitting the second output signal from the access point to the output port of the second splitter to a second node associated with a second output port of the first splitter.

* * * * *